United States Patent [19]

Bailey

[11] Patent Number: 5,355,720

[45] Date of Patent: Oct. 18, 1994

[54] CORROSION RESISTANT CABLE

[75] Inventor: Douglas S. Bailey, Deerfield, Ill.

[73] Assignee: Perma-Pipe, Inc., Niles, Ill.

[21] Appl. No.: 56,062

[22] Filed: May 7, 1993

Related U.S. Application Data

[63] Continuation-in-part of Ser. No. 893,499, Jun. 4, 1992, abandoned.

[51] Int. Cl.$^5$ .................. G01M 3/16; G01R 31/11
[52] U.S. Cl. .................. 73/40; 73/40.5 R; 73/49.1; 340/605; 324/533
[58] Field of Search .............. 73/40, 40.5 R, 49.1; 340/605, 618, 620; 324/533

[56] References Cited

U.S. PATENT DOCUMENTS

| | | | |
|---|---|---|---|
| 3,862,349 | 1/1975 | Watts | 73/40.5 R |
| 4,095,174 | 6/1978 | Ishido | 340/605 |
| 4,206,632 | 6/1980 | Suzuki | 73/40.5 R |
| 4,288,653 | 9/1981 | Blom et al. | 73/40.5 R |
| 4,487,057 | 12/1984 | Lutz | 73/40.5 R |
| 4,570,477 | 2/1986 | Sugibuchi | 73/40.5 R |
| 4,673,926 | 6/1987 | Gorman | 73/40.5 R |
| 4,677,371 | 6/1987 | Imaizumi | 340/605 |
| 4,797,621 | 1/1989 | Anderson et al. | 73/40.5 R |
| 4,877,923 | 10/1989 | Sahakian | 73/40.5 R |
| 4,896,527 | 1/1990 | Akiba | 73/40.5 R |
| 4,910,998 | 3/1990 | Willis et al. | 73/40.5 R |
| 4,918,977 | 4/1990 | Takahashi et al. | 73/40.5 R |
| 4,926,165 | 5/1990 | Lahlouh et al. | 73/40 |
| 5,001,928 | 3/1991 | Ogasawara | 340/620 |
| 5,058,421 | 10/1991 | Alexander et al. | 340/620 |
| 5,101,657 | 4/1992 | Lahlouh et al. | 73/40 |
| 5,109,202 | 4/1992 | Akiba | 340/605 |
| 5,109,218 | 4/1992 | Inglima | 340/620 |
| 5,159,276 | 10/1992 | Reddy, III | 340/605 |
| 5,177,996 | 1/1993 | Sahakian | 73/40.5 R |

Primary Examiner—Hezron E. Williams
Assistant Examiner—George M. Dombroske
Attorney, Agent, or Firm—Fitch, Even, Tabin & Flannery

[57] ABSTRACT

A corrosion resistant cable for use in electrical detection systems for fluid leaks in pipelines and the like includes a central electrical conductor, annular spacer means of electrically insulating material disposed around the central conductor, the annular spacer having a plurality of void spaces for receiving leakage fluid, and an annular sheath disposed around the spacer in concentric relation with the central conductor, the annular spacer formed of a plurality of electrically conductive wires, said wires having a coating of corrosion resistant material for protection against water, acids, alkalis, solvents or other liquids or environmental contaminants that may be present in the vicinity. An uninsulated wire may be incorporated in the sheath to cooperate with an uninsulated central conductor to detect conductive liquids, thereby allowing a leak detection system utilizing the cable to distinguish between leaks of conductive and non-conductive liquids.

35 Claims, 3 Drawing Sheets

CORROSION RESISTANT CABLE

CROSS-REFERENCE TO RELATED APPLICATION

This application is a continuation-in-part of U.S. patent application Ser. No. 07/893,499 filed on Jun. 4, 1992, now abandoned.

BACKGROUND OF THE INVENTION

1. Field of the Invention

The present invention relates to a new and improved corrosion resistant cable and more particularly to a new and improved electrical fluid detection cable. The cable is useful with fluid leak containment systems and other applications such as clean rooms, computer rooms, other raised floor applications and with directly buried cable applications adjacent to buried pipes and tanks. The contact of fluid with the cable changes the electrical characteristics thereof so that not only the presence of a leak can be ascertained but also the approximate location of the leak.

2. Background of the Prior Art

U.S. Pat. No. 3,600,674 discloses a method of determining leaks from buried pipelines using a time sharing transmission line.

U.S. Pat. No. 3,909,712 discloses a circuit arrangement for measuring high ohmic cable faults in telecommunications and similar networks.

U.S. Pat. No. 3,981,181 discloses a method for detecting liquid leaks and a cable therefor wherein the characteristic impedance of the cable is used in a pulse reflecting method for detecting and locating a liquid leak.

U.S. Pat. No. 4,797,621 discloses a leak detector and locator utilizing time domain reflectometry and sampling techniques. A cable in accordance with the present invention is especially useful with the leak detector disclosed in this patent.

OBJECTS OF THE INVENTION

It is an object of the present invention to provide a new and improved corrosion resistant cable and more particularly a new and improved electrical fluid detection for use in systems wherein the presence and location of a fluid leak may be ascertained by a change in impedance characteristics of the cable.

One of the common problems encountered in electrical cables utilized in leak detector systems as disclosed in Anderson et al. U.S. Pat. No. 4,797,621 is the corrosion of the detection cable that may be affected because of the presence of water, acids, alkalis, solvents and other environmental contaminants in the vicinity of the cable.

It is an object of the present invention to provide a new and improved electrical cable suitable for use in an electrical fluid leak detection system wherein the cable is well protected against corrosion from water, acids, alkalis, solvents and other intruding fluids.

Still another object of the present invention is to provide a new and improved electrical fluid leak detection cable of the character described which is highly resistant to corrosion as previously set forth and in addition has a corrosion resistant coating material which is highly resistant to softening even when exposed to high temperatures of 100° C. and upwards to as high as approximately 300° C.

Moreover, it is another object of the present invention to provide a new and improved electrical fluid leak detection cable which has improved corrosion resistant characteristics and is flexible, highly resistant to abrasion, and has a low coefficient of friction on an outer surface to facilitate easier pulling or drawing of the cable into a containment conduit or other tight space.

Yet another object of the present invention is to provide a new and improved electrical cable of the character described which employs an electrically conductive, braided outer sheath around a porous insulating spacer wherein the wires of the braided sheath are coated with a highly corrosion resistant material and yet the impedance characteristics and usefulness of the cable in a leak detection and location system is not adversely affected by the presence of a corrosion resistant coating material on an outer conductive braided sheath.

Still another object of the present invention is to provide a new and improved cable of the character described utilizing a corrosion resistant coating material that has a low coefficient of surface friction and a high resistance to abrasion yet remains flexible without brittleness.

Still another object of the present invention is to provide a leak detection cable capable of distinguishing between leaks of a non-conductive fluid such as a hydrocarbon leak and leaks of a conductive liquid such as water.

Yet another object is to provide a cable having an uninsulated wire interwoven with the insulated wires in the conductive sheath and an uninsulated central conductor for the purpose of distinguishing between conductive and non-conductive liquid leaks.

BRIEF SUMMARY OF THE PRESENT INVENTION

The foregoing and other objects and advantages of the present invention are accomplished in a new and improved corrosion resistant cable especially useful in electrical fluid leak detection systems and the like. The cable includes a central electrical conductor or core surrounded by an annular spacer of electrically insulated material mounted to extend around the central conductor core and having a plurality of void spaces adapted to receive any leakage fluid that is present in the vicinity. An annular, electrically conductive sheath is provided around the insulating annular spacer in concentric relationship to the central conductor. The sheath is formed of a plurality of relatively small diameter flexible, electrically conductive wires braided or otherwise wound together either individually or in groups around the electrically insulated spacer. These wires are coated with corrosion resistant material that is highly resistant to the deleterious affects of water, acids, alkalis, solvents and other contaminants that may be present. The corrosion resistant material utilized is flexible, resistant to abrasion, has a low coefficient of surface friction, is not brittle and will not appreciably soften up even when exposed to temperatures of 100° C. and upwards to as high as 300° C.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
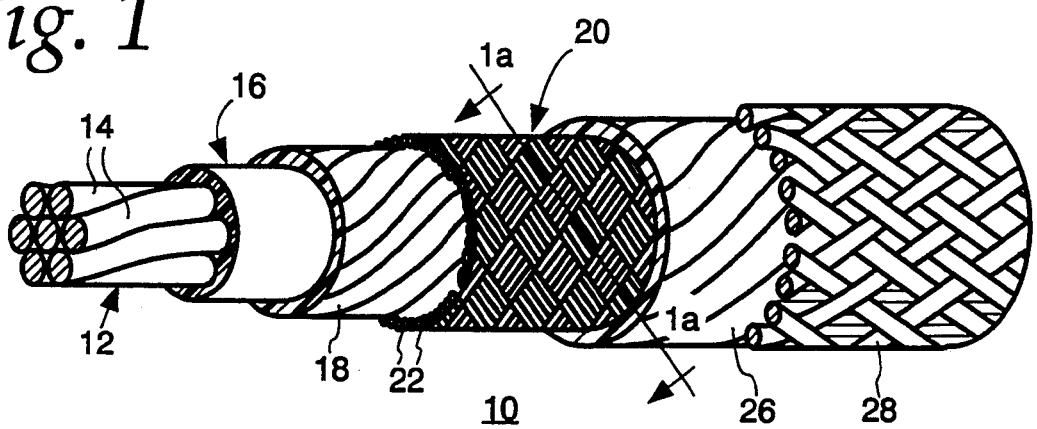
FIG. 1 is a cutaway view of a corrosion resistant cable in accordance with the features of the present invention showing the components thereof.
Figure 1A:
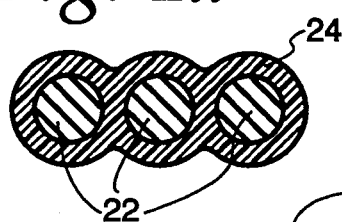
FIG. 1a is an enlarged fragmentary cross-sectional view taken along lines 1a—1a of FIG. 1.

Referring now to the drawings and FIGS. 1 and 1a in particular, therein is illustrated a new and improved corrosion resistant cable constructed in accordance with the features of the present invention and referred to by the reference numeral 10. The cable 10 is a coaxial, TFH type cable especially adapted for use with hydrocarbons and includes a central conductive core 12 (typically 10 ga. to 16 ga. in size) comprising a plurality of helically wound individual electrically conductive wires or strands 14, usually formed of highly conductive metal such as copper, aluminum and/or alloys thereof. The strands 14 typically range in size from 24 ga. to 34 ga. and are generally flexible.

The central conductor 12 is surrounded by an annular, extruded-in-place, coating or layer 16 of non-conductive, electrically insulating, resinous plastic material such as a polyamide-imide, a fluorinated ethylene propylene resin (FEP) or a polytetrafluoroethylene (PTFE) resin. A PTFE resin is used when high temperature fluids are likely to be encountered and for lower temperature applications, less expensive resins are utilized. The layer 16 is preferably extruded-in-place over the central conductor core 12 and generally, the extruded-in-place layer 16 ranges between 0.003" and 0.005" in thickness.

The inner insulating jacket or layer 16, is surrounded by an annular, coaxial porous spacer layer 18 formed by extruding a layer of PTFE material having a plurality of microscopic liquid permeable pores or voids therein over the layer 16 or by a helically or spirally winding flexible tape made of such expanded PTFE material over the layer 16. When these pores or voids in the layer 18 become filled or penetrated by fluid leakage, the presence of such fluid changes the electrical characteristic (i.e., impedance) of the cable 10 so that the presence of the leakage fluid and the position of the leakage along the length of the cable can be ascertained.

The thickness of the expanded PTFE extruded layer or tape making up the layer 18 may range between 0.050" and 0.060" in thickness. When tape is used, the edges of the adjacent helical convolutions are overlapped a slight amount and heat sintered together to provide a continuous helical connection between adjacent convolutions throughout the annular layer 18.

The porous layer 18 is encased within a braided, electrically conductive metal outer sheath 20 constructed in accordance with the features of the present invention. The sheath 20 is fabricated from a plurality of flexible, wires or strands 22 of relatively small size (i.e., 30 ga.–36 ga.) and the strands are wound or braided abut the porous layer 18 either individually or in groups of two, three, four, five or more. The conductive metal strands 22 (FIG. 1a) are braided in helical form to form a concentric, annular, electrically-conductive outer sheath around the central conductor 12 that is well protected against corrosion.

Figure 2:
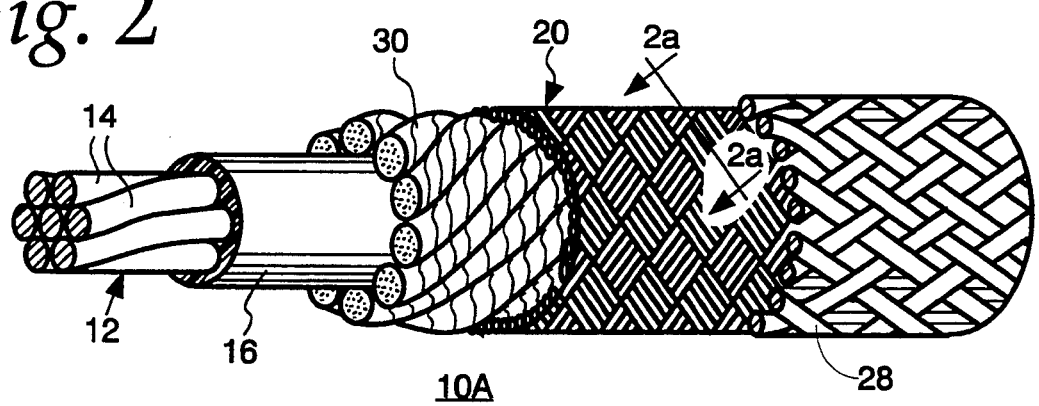
FIG. 2 is a cutaway view of another embodiment of a corrosion resistant cable constructed in accordance with the features of the present invention.
Figure 3:
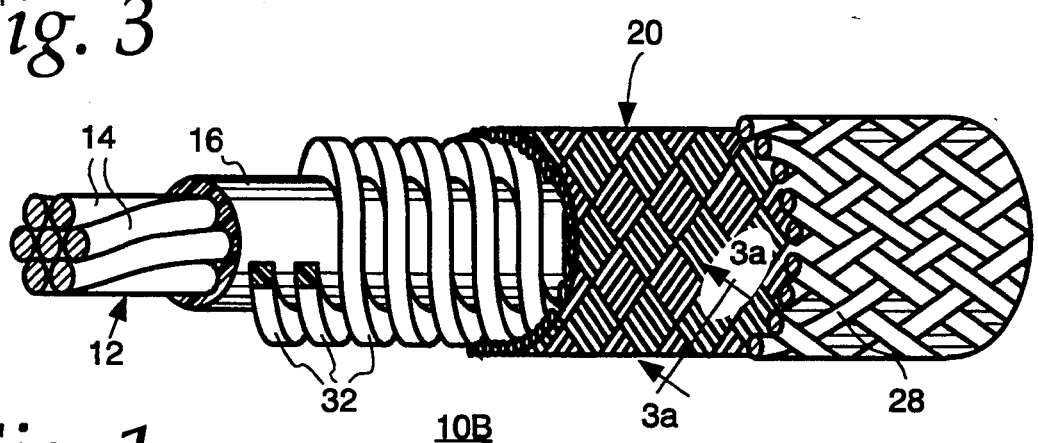
FIG. 3 is a cutaway view of yet another embodiment of a corrosion resistant cable constructed in accordance with the present invention.
Figure 2A:
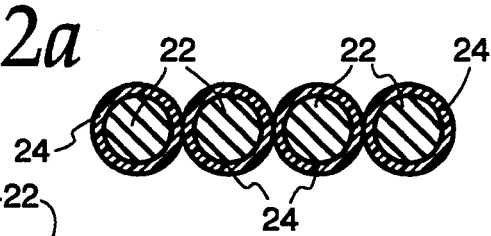
FIG. 2a is an enlarged fragmentary cross-sectional view taken substantially along lines 2a—2a of FIG. 2.
Figure 3A:
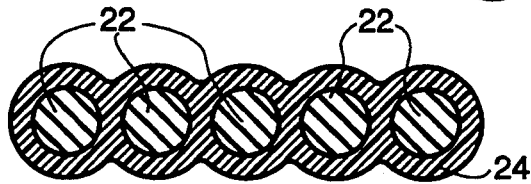
FIG. 3a is an enlarged fragmentary cross-sectional view taken substantially along lines 3a—3a of FIG. 3.

In accordance with the present invention, the conductors or strands 22 of the outer conductive sheath 20 are formed of low electrical resistance, flexible, conductive metal such as aluminum, copper, nickel coated copper and/or alloys thereof, and the wires are coated, either individually or in sets of two, three, four, or more with a thin layer of corrosion resistant material 24 (FIGS. 1a, 2a and 3a).

The coating material 24 applied to the metal strands or wires 22 of the braided outer sheath 20 ranges from 0.001" down to 0.0005" in thickness and the coating process is preferably accomplished in a dip bath with a sizing die for establishing the desired thickness of the coating. For some other types of polymer coatings an extrusion process may be utilized. Suitable corrosion resistant coating materials comprise polyimide resins, PTFE resins, fluoropolymer resins, ethylenechlorotrifluoroethylene copolymers, polyamide-imide resins and other resins chosen for more specific corrosion resistant characteristics which prevent the metal strands or wires 22 from corrosion because of the action of water, acids, alkalis, solvents, hydrocarbons and a wide variety of other contaminants.

When high temperatures are likely to be encountered for a particular application, resins such as a PTFE may be utilized because these resins have a resistance to softening at temperatures of 100° C. and greater up to as high as 300° C. and do not become brittle at these elevated temperatures.

In general, the coating resins that are used for the coating 24 on the wires 22 of the outer sheath 20 are chosen because of their high level of corrosion resistance and their high resistance to softening or brittleness under temperature extremes, either hot or cold.

It has been found that a cable 10 constructed in accordance with the foregoing parameters functions in a highly efficient, cost effective manner for a wide variety of applications for the detection and location of fluids or fluid leaks. While, for purposes of discussion, the present system according to the invention will be described as a system for detecting leaks, the techniques employed herein are also capable of detecting fluids or fluid leaks, both liquid and gaseous, irrespective of whether the fluid leak resulted from a leak or otherwise. Even though the corrosion resistant coating material 24 may be electrically non-conductive or insulative in nature the operational electrical characteristics of the cable 10 do not differ significantly from prior art cables which have a braided metal outer sheath formed of bare wire that is subject to corrosion. The absorption of fluids within the microscopic pores of the layer 18 effectively changes the impedance or capacitance value of the cable 10 between the central conductive core 12 and the outer metal braided jacket 20 and because of improved resistance to corrosion a high quality, long operational life and ease of installation and replacement is assured.

The cable 10 also includes a thin, outer layer 26 of extruded PTFE or spirally wound PTFE tape similar to the layer 18 for enclosing and protecting the conductive metal braided coaxial sheath 20. The outer jacket 26 is preferably formed of expanded PTFE or other resinous material having microscopic pores or voids so that hydrocarbons can penetrate through the layer 26 into the interior regions of the metallic braided sheath 20 to ultimately reach the voids or pores of the inner porous layer 18 as previously described. The outer jacket 26 protects the sheath 20 and is constructed to be similar to the inner jacket 18 utilizing spirally or helically wound convolutions of PTFE tape in thicknesses ranging from 0.010" to 0.025" with sintered seams.

In order to prevent snagging and to provide for easier drawing or pulling of the cable 10 through tight spaces or apertures, a protective plastic overbraid 28 is installed around the outer surface of the outer porous layer 26. The plastic overbraid 18 comprises a plurality of strands of monofilament resinous material such as polyester, polypropylene or other resins and in particular a resin sold under the trademark "HALAR". As many as 16 separate strands may be provided in the overbraid 28 and the individual strands may range from 0.010" to 0.015" in diameter. Where cost is a very sensitive factor and because corrosion of the braided sheath 20 is not a factor, a cable 10 may not require the use of an outer expanded PTFE porous layer 26 and the outer surface of the cable sheath 20 will be protected by the plastic overbraid 28 which has a low coefficient of friction.

Referring now to FIG. 2, therein is illustrated another embodiment of a corrosion resistant cable 10A constructed in accordance with the features of the present invention. The cable 10A is an AGT type, coaxial, wicking cable which employs a central conductive core 12 similar to that of the cable 10 in FIG. 1 and includes a thin, extruded-in-place plastic insulation layer 16 also similar thereto. The cable 10A however, includes porous layer 30 around the inner insulating layer 16 that is formed of 6 to 10 strands of 1680 denier, polypropylene, polyethylene, or other types of yarn. The yarn is helically or spirally wound and the yarn windings provide the porous layer 30 with a plurality of open spaces or voids, into which leakage fluid may penetrate via capillary action so as to change the electrical impedance or capacitance characteristics of the cable 10A whenever a fluid leak occurs.

The polypropylene yarn of layer 30 is helically or spirally wound around the extruded inner insulating layer 16 and, in turn, is surrounded by an electrically conductive, outer annular, metallic concentric sheath 20 formed of a plurality of braided conductive wires or strands 22 which are coated with a highly corrosion resistant polymer coating 24 of the type described in connection with the cable 10 of the previous embodiment. An outer, plastic overbraid 28 of slick, strong monofilament line of polyester resin such as a 16 strand 0.016 diameter monofilament is normally provided to prevent or restrict snagging and provide for a smooth pulling capability for the cable 10A.

The cable 10A is especially adapted for relatively low cost applications where water and the resultant dampness therefrom is a basic contaminant or fluid leakage problem likely to be encountered. With a wicking type yarn layer 30, whenever the pores or void spaces in the spirally wound yarn are penetrated by or filled with leakage fluid such as water or hydrocarbons, the electrical impedance or capacitance characteristic between the conductive core 12 and outer metallic conductive braided sheath 20 is altered or changed significantly. This alteration or change provides the basis of leak detection and electronic means are utilized to determine the location of the leak once the fact of a leakage condition is established.

Referring now to FIG. 3, therein is illustrated another embodiment of a corrosion resistant cable 10B constructed in accordance with the present invention and especially adapted to provide an air gap or quick dry cable type characteristic for use mainly in detecting water system leaks. The cable 10B is an AGW type coaxial cable and includes a central conductive core 12 and an inner extruded-in-place type, plastic insulating layer 16 formed around the central conductive core. In order to provide for more rapid drying and restoration to normal service after leakage has occurred, the cable 10B is provided with a helical winding or spacer formed by one or ore elongated strips 32 made of flexible, plastic material such as polyethylene, polypropylene, or other resins spirally wound around the insulating layer 16. Adjacent helical convolutions of the strips 32 are spaced apart (for example, by a distance of approximately 0.3") to form a spiral shaped open air space into which water or other leakage fluid can readily penetrate and thereby change the cable impedance or capacitance between the inner conductor 12 and the outer, conductive concentric metal sheath 20.

If a high temperature capability is desired for the cable 10B, the spirally or helically wound strips 32 may be formed of a heat or temperature resistant material such as PTFE resin or FEP resin. In general, two or more of the spirally wound strips 32 are utilized and are relatively large in cross-section. The strips 32 may be rectangular or square in cross-sectional shape and have thicknesses and/or widths up to 0.07". The cable 10B is provided with a conductive outer metal braided sheath 20 as previously described and a plastic overbraid 28 surrounds the outer conductive sheath 20 to facilitate the drawing or pulling of the cable 10B into operation position and eliminating or reducing the possibility of snags or cuts developing in the braided outer metal sheath 20. In general, the type AGW cable 10B of FIG. 3 is an air gap, rapid drying, water detection cable which is cost effective and provides for rapid drying action after a leak occurs. High temperature applications are well served by the cable 10B and repetitive or frequent fluid leakage situations do not require removal or replacement of the cable.

Figure 4:
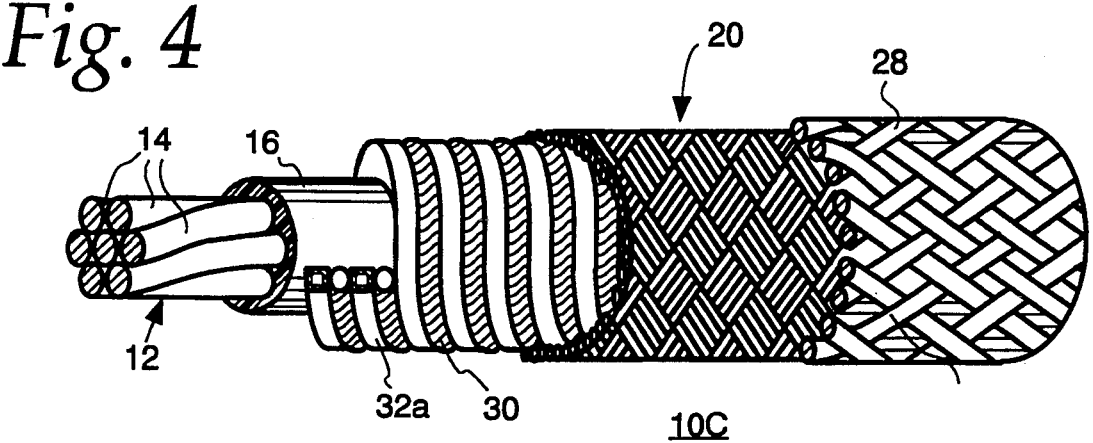
FIG. 4 is a cutaway view of still another embodiment of a corrosion resistant cable constructed in accordance with the features of the present invention.

Referring now to FIG. 4, therein is illustrated yet another embodiment of a cable 10C constructed in accordance with the features of the present invention, employing a central conductive core 12 and a thin, inner extruded-in-place insulating layer 16 of the type previously described. The porous annular spacing system of the cable 10C comprises a plurality of alternate, helically wound strips of hollow resinous plastic material 32a sandwiched between convolutions of wicking yarn as in the layer 30 as previously described. The plastic strips may also be solid in cross-section rather than hollow and both are generally square or rectangular in shape in transverse cross-section after being wound in place. Preferably strips 32a of a hollow configuration are used and these have an initially round cross-section but are subsequently flattened out upon winding in place to become generally rectangular in cross-sectional shape between adjacent convolutions formed of polypropylene or polyethylene wicking yarn 30 of the type previously described.

Preferably the strips 32a are formed of polyethylene, PTFE or FEP resins and the cable 10C has operating characteristics generally similar to the cable 10A of FIG. 2, except that the drying out time after a leakage has occurred is much faster because of the fact that non-porous convolutions of the plastic strips 32a fill up or occupy about half of the spacing volume between the inner insulation layer 16 and an outer metallic, coaxial, conductive sheath 20 which surrounds space defined by the yarn 30 and plastic strips 32a. It will thus be seen that the alternate convolutions of polypropylene or polyethylene yarn 30 and the hollow plastic strips 32a made of polyethylene, PTFE, polypropylene or the like, provide a relatively quick drying, wicking type cable useful in a wide variety of fluid leak detection applications. The cable 10C is provided with an outer plastic overbraid 28 similar to the other cables, which overbraid is applied over the conductive sheath 20 which surrounds the alternative convolutions of yarn 30 and plastic strips 32a.

Figure 5:
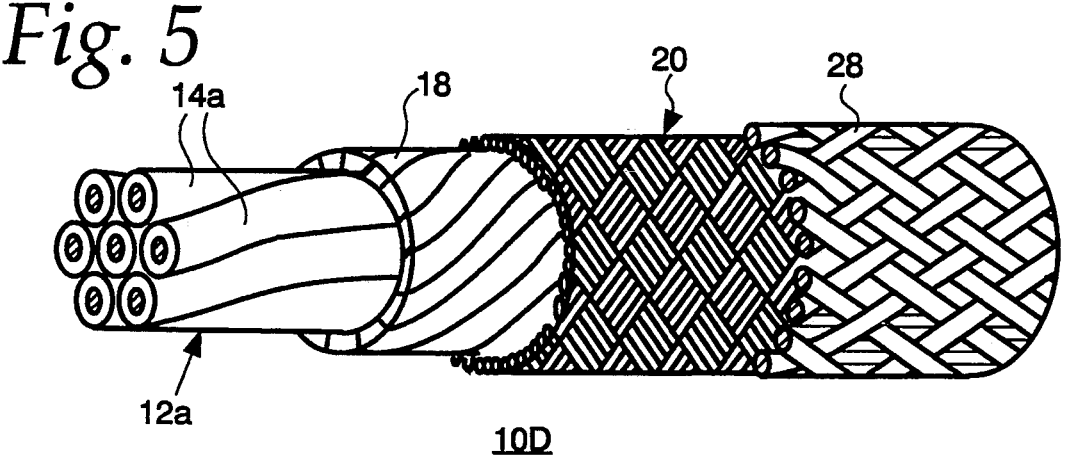
FIG. 5 is a cutaway view of a still further embodiment of a corrosion resistant cable constructed in accordance with the features of the present invention.

Referring now to FIG. 5, a corrosion resistant cable 10D in accordance with the present invention, is therein illustrated and employs a modified central conductive core 12a which is made up of a plurality of individually coated insulated wires or strands 14a. The wires or strands 14a are coated with electrically insulating material of a varnish or resinous type and can be coated with electrically insulating and corrosion resistant materials such as those used for the coating 24 applied to the conductors 22 as previously described. Thus the cable 10B does not require or utilize a layer 16 of thin, extruded-in-place insulating plastic material as in the cables previously described.

An annular spacer 18 of the cable 10B, is formed of a thin layer of spirally wound, expanded PTFE tape having minute pores or voids therein for receiving leakage fluid. Alternatively, a layer 18 of expanded PTFE resin having pores and voids therein may be applied in an extrusion process. As the leakage fluid such as a hydrocarbon replaces the air in the voids or pores of the spacer 18, the impedance or electrical capacitance characteristic of the cable 10D is changed to signal or detect that a leak indeed has occurred and the location thereof can be established.

The thin extruded layer or spirally or helically applied tape of expanded PTFE material making up the spacer layer 18 is applied directly around the central conductive core 12a and the seams of the tape are overlapped and sintered together to provide a continuous, porous annular layer 18 around the central conductive core 12a. A corrosion resistant coated metallic braided outer concentric conductive sheath 20 similar to the sheath 20 of the cables 10-10C, previously described is applied around the porous spacer layer 18 of the cable 10D and a plastic overbraid 28 is applied around the outside of the outer, conductive, metal, braided sheath 20 as in previous embodiments.

Figure 6:
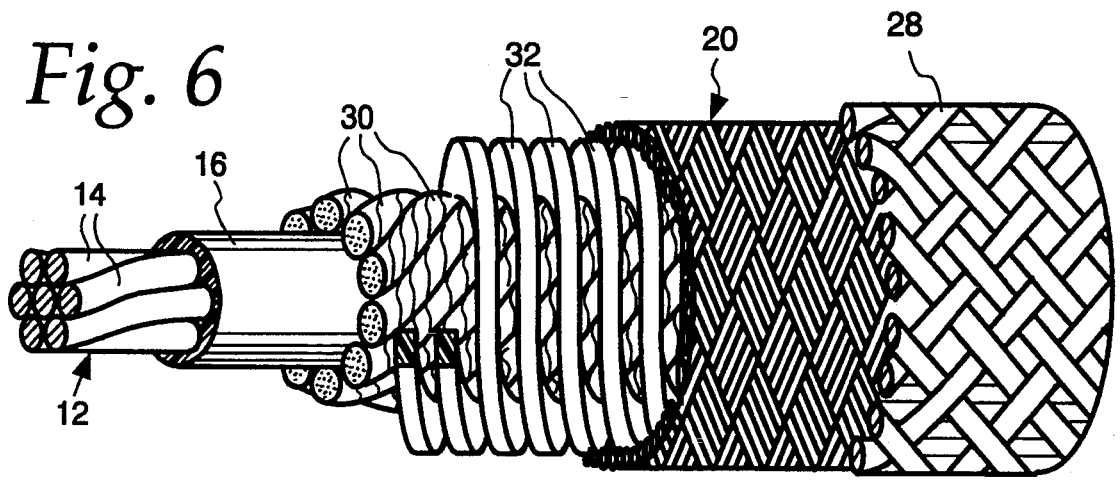
FIG. 6 is a cutaway view of yet another embodiment of a corrosion resistant cable constructed in accordance with the features of the present invention.

Referring now to FIG. 6, therein is illustrated still another embodiment of a corrosion resistant cable 10E constructed in accordance with the features of the present invention. Like the previously described cables 10, 10A, 10B and 10C, the cable 10E employs a central conductive core 12 surrounded by an extruded-in-place layer 16 of thin plastic insulating material. A spacer layer of the cable 10E, however, comprises a composite construction formed of an inner layer of spirally wound polypropylene or polyethylene yarn 30, which yarn acts as a wicking type cable to pick up fluid by capillary action in the voids or spacing between the strands of the yarn and between adjacent convolutions. Outwardly of the yarn layer 30, the cable 10E is provided with a plurality of spirally wound solid or hollow plastic strips 32 applied over the yarn layer and wound in an opposite direction. An air gap or space is formed between adjacent convolutions of the strips 32 so as to form an enlarged open space available for collection of fluid leakage. The strips 32 may be of square cross-section or may be of a hollow construction like the strips 32a of the cable 10C of FIG. 4. Outwardly of the spirally wound strips 32-32a, the cable 10E is provided with a metal, conductive, concentric braided sheath 20 similar to those previously described and having the wires 22 thereof provided with a coating 24 of corrosion resistant material. A plastic overbraid 28 is also provided around the outer surface of the outer conductive metal sheath 20 as in the prior embodiments.

The cable 10E thus provides a pluralistic operating characteristic whereby fluid leakage to a certain level or depth only occupies the spaces between adjacent convolutions of the outer plastic strips 32 resulting in a first level or type of impedance or capacitance change. However, should the depth of leakage fluid become greater than the thickness of the plastic strips 32, the plastic yarn 30 becomes wetted and the wicking effect takes place. When this occurs, a second type of impedance or capacitance changes takes place providing an indication that a greater amount of leakage has occurred. The greater depth of the leakage fluid changes the electrical characteristics of the cable 10E significantly because of the additional absorption or penetration of leakage fluid into the yarn layer 30. Thus the cable 10E provides two different characteristics of signal detection and location information dependent upon the amount of volume of leakage is effective for a variety of different applications wherein the amount or level of leakage fluid is a desirable factor to have knowledge of.

From the foregoing it will be seen that the cables 10 through 10E constructed in accordance with the present invention all employ a highly corrosion resistant coating on an outer conductive metal sheath 20 and the coating is also able to withstand high and low temperature extremes while providing a relatively low coefficient of friction, and relatively high strength. Long cable life is thus assured with no sacrifice in electrical characteristics.

Figure 7:
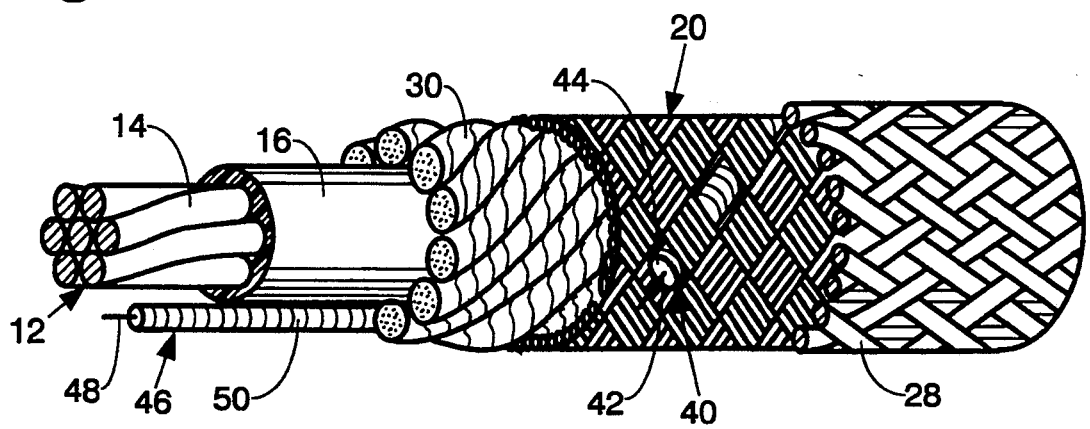
FIGS. 7 and 8 are cutaway views similar to FIGS. 2 and 3 showing additional uninsulated conductors used to distinguish between conductive and non-conductive fluids.

Referring now to FIG. 7, there is shown another embodiment of the cable that is capable of differentiating between leaks of a non-conductive fluid, such as a liquid hydrocarbon, and conductive fluids, such as water. The cable illustrated in FIG. 7 is similar to the cable illustrated in FIG. 3, except that one of the groups of wires forming the sheath 20 has been replaced by a wire 40 having a central conductor 42 and a protective covering 44. The central conductor 42 has a heavier wire gauge than the gauge of the individual wires in the group that it replaced. The gauge of the wire 42 may be on the order of 30 gauge, but the gauge will vary depending on the size of the cable. The protective covering 44 is an electrically conductive covering which may be a polymer coating impregnated with carbon or graphite extruded about the central conductor 42. The coating may have a resistivity on the order of 1–1000 ohm-cm and preferably on the order of 5–25 ohm-cm. An additional wire 46 is placed parallel to the central conductor 12. The wire 46 has a central conductor 48 similar to the central conductor 42, and a protective covering 50 similar to the protective covering 44. Alternatively, the wires 42 and 48 can be fabricated from a noncorrosive material such as stainless steel, thereby eliminating the need for the protective coverings 44 and 50. In addition, the central conductor 46 can be eliminated if the central conductor 14 is not insulated or covered by a conductive covering such as the covering 44 or 50. In such a cable, the resistance measurement would be made between the wire 40 and the central conductor 14. Also, if both of the insulated and uninsulated central conductors are used, the conductors of the outer shield may be uninsulated and the TDR measurement made between the shield and the insulated central conductor and the resistance measurement made between the shield and the uninsulated central conductor.

The cable of FIG. 7 permits the system to discriminate between electrically non-conductive leaks such as liquid hydrocarbon leaks and electrically conductive leaks such as water leaks. The discrimination is accomplished by electrically connecting the central conductor 48 of the wire 46 to the central conductor 14 of the wire 12 at each end of the cable and by connecting the central conductor 42 to the braid 20 at each end of the cable. The resistance between the conductors 42 and 48 at the sensing end of the cable is measured when no leak is present and that value is stored.

Figure 8:
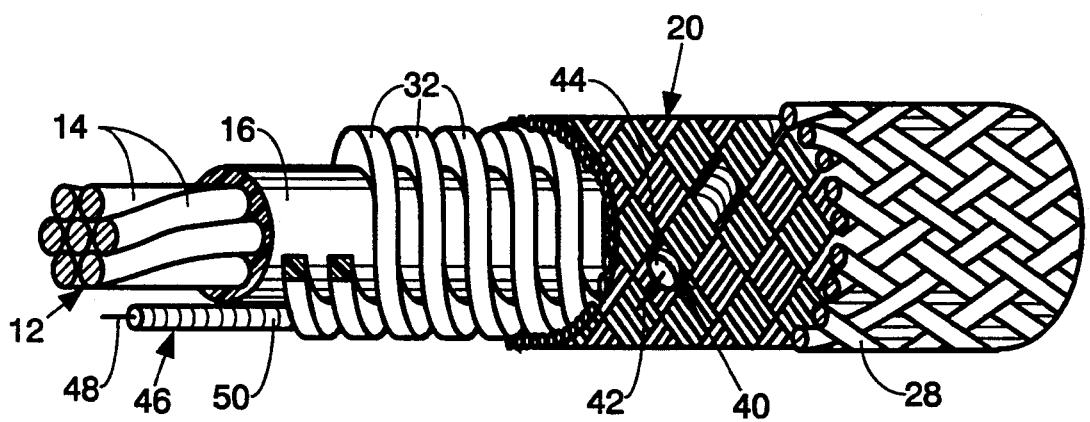

While monitoring the cable, electrical pulses are applied between the braid 20 and the central conductor 14 to monitor for leaks utilizing the time domain reflectometry previously discussed. When a leak has been detected utilizing time domain reflectometry, the resistance between the central conductors 40 and 42 is measured. If there is no change in resistance or only a minimal change, the leak is a non-conductive fluid, such as a hydrocarbon. If there is a substantial change, then the leak is a conductive fluid, such as water. Thus, the cable illustrated in FIG. 7 is capable of not only detecting and locating a leak, but also of determining whether the leak is electrically conductive or non-conductive. A system suitable for use in conjunction with a cable such as the cable illustrated in FIGS. 7 and 8 is disclosed in U.S. patent application Ser. No. 08/057,808, pending, entitled "METHOD AND APPARATUS FOR DETECTING AND DISTINGUISHING LEAKS" filed on May 7, 1993 by the same inventor named in the present application and incorporated herein by reference.

FIG. 8 shows another embodiment of a cable capable of distinguishing between conductive and non-conductive liquids. The cable illustrated in FIG. 8 is similar to that illustrated in FIG. 7, except that the uninsulated wires are added to a cable similar to the cable illustrated in FIG. 4; however, the operation of the cable illustrated in FIG. 8 is the same as that illustrated in FIG. 7. In addition, wires such as 40 and 46 may be employed in conjunction with various types of coaxial and non-coaxial cables including, but not limited to, the cables illustrated in FIGS. 1–6 of the attached drawing. The uninsulated wire may also be wrapped about the exterior of the shield rather than being interwoven with the shield wires or may simply be run inside or outside the shield.

Also, the cable need not be of a coaxial construction, but for example, may be formed as parallel, spaced insulated and uninsulated conductors.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An electrical fluid leak detection cable comprising:
a central electrical conductor;
annular spacer means of electrically insulating material disposed around said central conductor, said annular spacer means having a plurality of void spaces for receiving leakage fluid; and
an annular sheath disposed around said spacer means in concentric relationship with said central conductor;
said sheath being formed of a plurality of electrically conductive wires braided in a helical configuration to form a sheath around said central electrical conductor, said wires being coated with a corrosion resistant material before braiding.

2. The electrical coaxial cable of claim 1, wherein:
said wires of said sheath are braided and provide a plurality of openings for permitting entry of said leakage fluid into said void spaces of said spacer means thereby affecting the electrical capacitance between said central conductor and said sheath.

3. The electrical cable of claim 1, wherein:
said wires of said sheath are flexible and are coated with a resinous plastic material for protecting said wires against water, acids, alkalis and solvents.

4. An electrical fluid leak detection cable comprising:
a central electrical conductor;
annular spacer means of electrically insulating material disposed around said central conductor, said annular spacer means having a plurality of void spaces for receiving leakage fluid; and
an annular sheath disposed around said spacer means in concentric relationship with said central conductor;
said sheath being formed of a plurality of electrically conductive wires, said wires being coated with a corrosion resistant material, wherein said corrosion resistant coating material is a polyamide-imide resin.

5. The electrical cable of claim 1, wherein:
said corrosion resistant coating material is resistant to softening when exposed to temperatures between 100° C. and 300° C.

6. The electrical cable of claim 1, wherein:
said corrosion resistant coating material is flexible, is resistant to abrasion and is not brittle.

7. The electrical cable of claim 1, wherein:
said corrosion resistant coating material comprises a fluoropolymer resin.

8. The electrical cable of claim 1, wherein:
said annular spacer means comprises resinous strip means wound spirally around said central conductor with spacing between convolutions forming said void spaces.

9. The electrical cable of claim 1, wherein:
said annular spacer means comprises wicking material placed around said central conductor in a spiral pattern and forming said void spaces.

10. A flexible, coaxial cable comprising:
a central electrical conductor;
annular electrically insulative spacer means placed around said central conductor, said spacer means having a plurality of void spaces defined therein; and
an annular electrically conductive braided sheath disposed around said spacer means in concentric relationship with said central conductor;
said sheath being formed of a plurality of electrically conductive wires braided in a helical configuration to form a sheath around said central electrical conductor, said wires being coated with a corrosion resistant material before braiding.

11. The coaxial cable of claim 10, wherein:
said wires of said sheath are wound to form a plurality of openings for permitting leakage fluid to enter said void spaces of said spacer means thereby affecting the electrical capacitance between said central conductor and said sheath.

12. The coaxial cable of claim 10, wherein:
said wires of said sheath are coated with a resinous plastic material for protecting said wires against acids, alkalis and solvents.

13. The coaxial cable of claim 10, wherein:
said corrosion resistant coating material comprises a non-conductive polymer.

14. The coaxial cable of claim 10, including:
an annular outer protective jacket around said sheath.

15. The coaxial cable of claim 14, wherein:
said outer jacket is formed of braided material that has a low coefficient of friction and is resistant to abrasion.

16. The coaxial cable of claim 10, wherein:
said corrosion resistant coating material comprises polytetrafluoroethylene resin.

17. The coaxial cable of claim 10, including:
an inner electrically insulative jacket around said central conductor inside said annular spacer means.

18. A flexible, coaxial cable comprising:
a central electrical conductor;
annular electrically insulative spacer means placed around said central conductor, said spacer means having a plurality of void spaces defined therein; and
an annular, electrically conductive braided sheath disposed around said spacer means in concentric relationship with said central conductor;
said sheath being formed of a plurality of electrically conductive wires, said wires being coated with a corrosion resistant material; wherein said corrosion resistant coating material is an electrically conductive material.

19. A flexible, coaxial cable comprising:
a central electrical conductor;
annular electrically insulative spacer means placed around said central conductor, said spacer means having a plurality of void spaces defined therein; and
an annular, electrically conductive braided sheath disposed around said spacer means in concentric relationship with said central conductor;
said sheath being formed of a plurality of electrically conductive wires, said wires being coated with a corrosion resistant material; wherein said central conductor comprises a plurality of wires individually coated with corrosion resistant material.

20. A flexible, coaxial cable comprising:
a central electrical conductor;
annular electrically insulative spacer means around said central conductor, said spacer means having a plurality of void spaces defined therein; and
an annular, electrically conductive braided sheath disposed around said spacer means in concentric relationship with said central conductor;
said sheath being formed of a plurality of electrically conductive wires, said wires being coated with a corrosion resistant material; wherein said corrosion resistant material comprises a polyamide-imide resin.

21. A flexible, coaxial cable comprising:
a central electrical conductor;
annular electrically insulative spacer means placed around said central conductor, said spacer means having a plurality of void spaces defined therein; and
an annular, electrically conductive braided sheath disposed around said spacer means in concentric relationship with said central conductor;
said sheath being formed of a plurality of electrically conductive wires, said wires being coated with a corrosion resistant material; wherein said corrosion resistant material comprises a composite of a layer of polyimide resin and a polyurethane top coat for providing resistance against chemical corrosion and water damage.

22. An electrical fluid detection cable capable of distinguishing between conductive fluids and non-conductive fluids, comprising:
an insulated central electrical conductor;
an uninsulated central electrical conductor;
a spacer fabricated from electrically non-conductive material and disposed about said central conductors, said spacer having a plurality of voids formed therein for receiving fluid; and
an outer shield disposed around said spacer, said shield being formed from a plurality of insulated electrical shielding conductors and one uninsulated electrical shielding conductor.

23. A cable as recited in claim 22, wherein said insulated conductors are coated with a corrosion resistant electrically conductive coating material.

24. A cable as recited in claim 23, wherein said coating material is a conductive polymer.

25. A cable as recited in claim 22, wherein said uninsulated shielding conductor is interlaced with said insulated shielding conductors to form said shield, said shield having a plurality of openings therein for permitting the passage of fluid therethrough.

26. An electrical fluid detection cable capable of distinguishing between conductive fluids and non-conductive fluids, comprising:
an uninsulated central electrical conductor;
an electrically non-conductive spacer, disposed about said central conductor, said spacer having a plurality of voids formed therein for receiving fluid; and
an outer shield disposed around said spacer, said shield being formed from a plurality of insulated electrical shielding conductors and one uninsulated electrical shielding conductor.

27. A cable as recited in claim 26, wherein said shielding uninsulated conductors are coated with a corrosion resistant electrically conductive coating material.

28. A cable as recited in claim 27, wherein said coating material is a conductive polymer.

29. A cable as recited in claim 26, wherein said uninsulated shielding conductor is interlaced with said insulated shielding conductors to form said shield, said shield having a plurality of openings therein for permitting the passage of fluid therethrough.

30. A coaxial cable, capable of distinguishing between conductive fluids and non-conductive fluids, comprising:

a first insulated electrical conductor;

a second insulated electrical conductor, formed as an annular sheath, disposed in a coaxial relationship with said first electrical conductor;

a fluid permeable porous material separating said first and second electrical conductors;

a third uninsulated electrical conductor disposed adjacent said first insulated electrical conductor; and a fourth uninsulated electrical conductor disposed adjacent said second electrical conductor, said third and fourth electrical conductors being separated by said porous material.

31. A coaxial cable as recited in claim 30, wherein said uninsulated conductors are coated with a corrosion resistant electrically conductive coating material.

32. A coaxial cable as recited in claim 31, wherein said coating material is a conductive polymer.

33. A coaxial cable capable of distinguishing between conductive fluids and non-conductive fluids, comprising:

a first uninsulated electrical conductor;

a second uninsulated electrical conductor, formed as an annular sheath, disposed in a coaxial relationship with said first uninsulated electrical conductor; and a third uninsulated electrical conductor disposed adjacent said second electrical conductor;

a fluid permeable porous material separating said first electrical conductor from said second and third electrical conductors.

34. A coaxial cable as recited in claim 33, wherein said uninsulated conductors are coated with a corrosion resistant electrically conductive coating material.

35. A coaxial cable as recited in claim 34, wherein said coating material is a conductive polymer.

* * * * *

UNITED STATES PATENT AND TRADEMARK OFFICE
CERTIFICATE OF CORRECTION

PATENT NO. : 5,355,720
DATED      : October 18, 1994
INVENTOR(S) : Douglas S. BAILEY It is certified that error appears in the above-indentified patent and that said Letters Patent is hereby corrected as shown below:

In Column 10, line 26, delete "coaxial" after "electrical".

In Column 12, line 2, after "means" insert the word --placed--.

In Column 12, lines 43-44, change "insulated" to read --uninsulated--.

Signed and Sealed this

Twenty-fourth Day of January, 1995

Attest:

BRUCE LEHMAN

Attesting Officer

Commissioner of Patents and Trademarks